United States Patent [19]
Rolfes et al.

[11] Patent Number: 6,015,778
[45] Date of Patent: Jan. 18, 2000

[54] PROCESS FOR MAKING OVERBASED CALCIUM SULFONATE DETERGENTS USING CALCIUM OXIDE AND A LESS THAN STOICHIOMETRIC AMOUNT OF WATER

[75] Inventors: Allen J. Rolfes, Mentor, Ohio; Scot Eric Jaynes, Pendleton, N.Y.

[73] Assignee: The Lubrizol Corporation, Wickliffe, Ohio

[21] Appl. No.: 09/049,449

[22] Filed: Mar. 27, 1998

[51] Int. Cl.$^7$ .................................................. C10M 159/22
[52] U.S. Cl. ........................... 508/394; 508/398; 508/402
[58] Field of Search .................... 508/394, 392, 508/402, 391, 398; 44/387

[56] References Cited

U.S. PATENT DOCUMENTS

| | | | |
|---|---|---|---|
| 2,764,548 | 9/1956 | King et al. | 44/370 |
| 3,384,587 | 5/1968 | Holst et al. | 252/33.4 |
| 3,471,403 | 10/1969 | LeSuer et al. | 252/39 |
| 4,086,170 | 4/1978 | De Clippeleir et al. | 252/33 |
| 4,164,474 | 8/1979 | Gallachev et al. | 508/370 |
| 4,182,613 | 1/1980 | Stover et al. | 44/370 |
| 4,387,033 | 6/1983 | Lenack . | |
| 4,604,219 | 8/1986 | Whittle | 252/25 |
| 4,615,941 | 10/1986 | Stamatakis et al. | 44/370 |
| 4,775,490 | 10/1988 | Nichols et al. | 252/39 |
| 4,863,624 | 9/1989 | Emert . | |
| 4,954,272 | 9/1990 | Jao et al. | 252/25 |
| 5,011,618 | 4/1991 | Papke et al. . | |
| 5,259,966 | 11/1993 | Burke et al. | 252/18 |
| 5,534,168 | 7/1996 | Cleverley et al. | 508/396 |

*Primary Examiner*—Margaret Medley
*Attorney, Agent, or Firm*—James L. Cordek; Joseph P. Fischer

[57] ABSTRACT

A process for producing an overbased oil soluble calcium sulfonate, comprising the steps of: (a) mixing a substrate comprising a sulfonic acid or a calcium salt of a sulfonic acid, with at least one alcohol, a diluent oil, a carboxylic acid, an acidic material, water and calcium oxide to form a mixture; (b) heating the mixture to its reflux point to form a neutral calcium salt of the acid moieties; (c) removing a substantial portion of distillable solvents to form an intermediate residue; (d) adding to the intermediate residue at least one alcohol, a surfactant, calcium oxide and water such that for every 100 parts of substrate, there are not more than 25 parts water to form an intimate mixture having a direct base number of 90–250; (e) heating said intimate mixture (d) to below its reflux point to form a heated intimate mixture; (f) passing gaseous carbon dioxide into the heated intimate mixture (e) to form an overbased calcium sulfonate and a mixture of calcium hydroxide, calcium carbonate and regenerated water until the direct base number is from 90–150; (g) adding additional calcium oxide until the direct base number is from 90–250 followed by the passing of additional gaseous carbon dioxide until the direct base number is from 90–150; (h) continuing the passing of gaseous carbon dioxide to a direct base number of 0–75 after the last portion of calcium oxide is added; (i) removing any distillable solvents to form a final residue; and (j) filtering the final residue to obtain a substantially solvent-free and solids-free oil soluble overbased calcium sulfonate; with the proviso that calcium oxide is the only substantial source of overbasing calcium.

18 Claims, No Drawings

6,015,778

PROCESS FOR MAKING OVERBASED CALCIUM SULFONATE DETERGENTS USING CALCIUM OXIDE AND A LESS THAN STOICHIOMETRIC AMOUNT OF WATER

FIELD OF THE INVENTION

The present invention relates to a process for preparing overbased calcium sulfonate detergents wherein calcium oxide is reacted with water to form calcium hydroxide which is then reacted with carbon dioxide to form an amorphous calcium carbonate.

BACKGROUND OF THE INVENTION

Historically overbased calcium sulfonates have been prepared by reacting a sulfonic acid with calcium hydroxide and carbon dioxide. This process generates a great amount of water. Removing the water extends the processing time, causes the overbased sulfonate to be viscous and generates water waste stream which must be treated before discharging to a sewer. These problems are ameliorated, if not eliminated, by utilizing calcium oxide and a less than stoichiometric amount of water in place of calcium hydroxide.

U.S. Pat. No. 3,384,587 (Holst et al., May 21, 1968) relates to a method of preparing hyperbasic calcium sulfonate lube oil concentrate useful as detergent dispersant additive in oils comprising forming a first reaction mixture of sulfonic acid or salt thereof, calcium hydroxide or calcium oxide and water, lower alkanol or lower alkoxy ethanol, and lubricating oil, sequentially injecting hydrogen sulfide and carbon dioxide under a hydrogen sulfide and carbon dioxide pressure of at least 10 p.s.i.g. and stripping off incidental water and oxygenated vehicle.

U.S. Pat. No. 3,471,403 (LeSuer et al., Oct. 7, 1969) discloses metal carboxylate complexes that are obtained by treating an oil-soluble carboxylic acid with a metal base in the presence of an acidic gas and an alcoholic promoter. The complexes are useful as detergent additives in fuels, oils, and other organic compositions and are especially useful in lubricating compositions.

U.S. Pat. No. 4,086,170 (De Clippeleir et al., Apr. 25, 1978) relates to calcium sulfonates and concentrated oily solutions thereof that are prepared by reacting a solution of alkylbenzene sulfonic acids with an excess of a calcium oxide having a medium or low activity towards water and with carbon dioxide. Oily solutions of overbased calcium sulfonate obtained from such a calcium oxide are limpid and filterable.

U.S. Pat. No. 4,604,219 (Whittle, Aug. 5, 1986) is directed to alkaline earth calcium sulfonates that are derived from natural or synthetic feedstocks or a mixture of both which can be overbased by introducing into a mixture comprising a neutral alkaline earth calcium sulfonate, a lower alcohol, a light hydrocarbon diluent carbon dioxide and water. The water is introduced continuously and at a uniform rate over 1–4 hours, preferably 1–3 hours into the heated mixture with carbon dioxide. Water is added in a molar ratio water/calcium oxide of 0.1 to 1.2 preferably 0.4 to 0.8. It has been found that both the water rate and amount are critical. It has been unexpectedly found that a superior product is formed by adding water continuously during carbonation rather than all charged in one or several increments at the beginning of the carbonation. In this reference, a high calcium sulfonate product with improved filterability and high clarity is formed with good lime utilization.

U.S. Pat. No. 4,775,490 (Nichols et al., Oct. 4, 1988) describes a process for overbasing a substrate comprising mixing the substrate, water, a phenol, a source of magnesium and a carbonating agent, wherein the water is retained throughout the overbasing reaction and provided further that the weight ratio of the water to the magnesium is in a 10:1 to 1:5 weight ratio, thereby obtaining a magnesium overbased substrate.

U.S. Pat. No. 4,954,272 (Jao, et al., Sep. 4, 1990) is directed to a process for producing an overbased oil soluble calcium sulfonate having a TBN of 325, said process comprising:

(a) diluting a neutral calcium sulfonate with a hydrocarbon solvent and a lower alkanol;

(b) adding to the diluted calcium sulfonate solution, CaO, $Ca(OH)_2$ and $H_2O$ in molar ratios of $CaO:Ca(OH)_2$ of about 90:10 to about 20:80 and of $H_2O:CaO$ of about 0.15:1 to about 0.30: 1;

(c) heating the sulfonate mixture to a temperature ranging from about 100° F. to about 170° F. under a pressure ranging from about 0 to about 50 p.s.i.g.;

(d) passing $CO_2$ into the heated sulfonate mixture for a period of about 50 to out 200 minutes;

(e) adding a diluent oil to the $CO_2$ treated sulfonate mixture;

(f) separating the solids from the liquid of the sulfonate mixture; and (g) stripping the hydrocarbon solvent from the resulting overbased oil soluble sulfonate product having TBN of 325.

U.S. Pat. No. 5,259,966 (Burke, Jr., et al., Nov. 9, 1993) provides a process for preparing an overbased calcium salt, comprising mixing together:

(a) an oil-soluble acid material;

(b) a promoter comprising:

(i) an alcohol or alcohol mixture, and (ii) an inorganic calcium salt other than chloride which is soluble in the alcohol mixture of (i), or an acid or salt which forms said inorganic calcium salt when treated with a calcium base; and (c) greater than 1 equivalent of a calcium base per equivalent of oil-soluble acid material.

U.S. Pat. No. 5,534,168 (Cleverley et al., Jul. 9, 1996) relates to the use of magnesium oxide of specified, low, reactivity in a process for the production of overbased magnesium sulfonates, together with the introduction of water and an alcohol, into the reaction mixture during carbonation, makes it possible to prepare high base number products which have very low post carbonation sediments and which can be purified by rapid filtration.

SUMMARY OF THE INVENTION

A process for producing an overbased oil soluble calcium sulfonate is disclosed which comprises the steps of:

(a) mixing a substrate comprising a sulfonic acid or a calcium salt of a sulfonic acid, with at least one alcohol, a diluent oil, a carboxylic acid, an acidic material, water and calcium oxide to form a mixture;

(b) heating the mixture to its reflux point to form a neutral calcium salt of the acid moieties;

(c) removing a substantial portion of distillable solvents to form an intermediate residue;

(d) adding to the intermediate residue at least one alcohol, a surfactant, calcium oxide and water such that for every 100 parts of substrate, there are not more than 25 pairs water to form an intimate mixture having a direct base number of 90–250;

(e) heating said intimate mixture (d) to below its reflux point to form a heated intimate mixture;

(f) passing gaseous carbon dioxide into the heated intimate mixture (e) to form an overbased calcium sulfonate and a mixture of calcium hydroxide, calcium carbonate and regenerated water until the direct base number is from 90–150;

(g) adding additional calcium oxide until the direct base number is from 90–250 followed by the passing of additional gaseous carbon dioxide until the direct base number is from 90–150;

(h) continuing the passing of gaseous carbon dioxide to a direct base number of 0–75 after the last portion of calcium oxide is added;

(i) removing any distillable solvents to form a final residue; and (j) filtering the final residue to obtain a substantially solvent-free and solids-free oil soluble overbased calcium sulfonate;

with the proviso that calcium oxide is the only substantial source of overbasing calcium.

DETAILED DESCRIPTION OF THE INVENTION

In order to produce the overbased oil-soluble calcium sulfonate of this invention, it is necessary to begin with a substrate. The substrate comprises a sulfuric acid or a calcium salt of a sulfuric acid. The substrate can be represented by the formulae:

$(R^1)_x(R^2)_y$—T—$(SO_3H)_z$, (I)

$(R^2)_y$—T—$(SO_3H)_z$, or (II)

$R^3$—$SO_3H$ (III)

wherein $R^1$ is an aliphatic group containing 1 or 2 carbon atoms, $R^2$ is an aliphatic group containing at least 8 carbon atoms, $R^3$ is an aliphatic group containing at least 15 carbon atoms, T is a cyclic nucleus of the mono-or poly-nuclear type and within (I), x, y and z are each independently an integer of 1 up to 3 times the number of aromatic nuclei present in T with the proviso that the sum of x, y and z does not exceed the unsatisfied valences of T, or within (II), y is an integer of from 1 to 3 and z is an integer of from 1 to 4 with the proviso that the sum of y and z does not exceed he unsatisfied valences of T.

The $R^1$, $R^2$ and $R^3$ aliphatic groups above are further defined as alkyl, alkenyl, alkoxy, alkoxyalkyl, and carboalkoxyalkyl. Preferably the aliphatic groups of $R^1$, $R^2$ and $R^3$ are alkyl groups.

Preferably $R^2$ contains at least 12 carbon atoms and most preferably $R^2$ contains from 16 to 50 carbon atoms.

Specific examples of $R^3$ are groups derived from petrolatum, activated and unsaturated paraffin wax, and polyolefins, including polymerized $C_2$, $C_3$, $C_4$, $C_5$, $C_6$ etc., olefins containing from about 15 to 7000 or more carbon atoms.

The cyclic nucleus T is further defined as a nucleus of benzene, naphthalene, anthracene, phenanthrene, diphenyl oxide, thianthrene, phenothioxine, diphenylene sulfide, phenothiazine, diphenylene oxide, diphenyl sulfide, diphenylamine, cyclohexane, petroleum naphthenes, decahydro-naphthalene, cyclopentane, etc. Preferably T is a benzene or naphthalene nucleus and most preferably T is a benzene nucleus.

The groups $R^1$, $R^2$, $R^3$ and T in the above formulae can also contain other inorganic or organic substituents in addition to those enumerated above such as, for example, hydroxy, mercapto, halogen, nitro, amino, nitoso, sulfide, disulfide, etc. Within Formula (I) or (II) preferably z is 1. Within Formula (I) preferably x and y are both 1.

Specific examples of sulfonic acids, useful in the process of this invention are mahogany sulfonic acids, bright stock sulfonic acids, sulfonic acids derived from lubricating oil fractions having a Saybolt viscosity from about 100 seconds at 100° F. to about 200 seconds at 210° F., petrolatum sulfonic acids, mono- and poly-wax substituted sulfonic and polysulfonic acids of, e.g., benzene, naphthalene, phenol, diphenyl ether, naphthalene disulfide, diphenylamine, thiophene, alpha-chloronaphthalene, etc., other substituted sulfonic acids such as alkyl benzene sulfonic acids (where the alkyl group has at least 8 carbon atoms), cetylphenol mono-sulfide sulfonic acids, dicetyl thianthrene disulfuric acids, dilauryl beta napthyl sulfonic acid, dicapryl nitronaphthalene sulfonic acids, and alkaryl sulfonic acids such as dodecyl benzene "bottoms" sulfonic acids.

The latter acids are derived from benzene which has been alkylated with propylene tetramers or isobutene trimers to introduce 1, 2, 3 or more branched chain $C_{12}$ substituents on the benzene ring. Dodecyl benzene bottoms, principally mixtures of mono- and di-dodecyl benzenes, are available as by-products from the manufacture of household detergents. Similar products obtained from alkylation bottoms formed during manufacture of linear alkyl sulfonates (LAS) are also useful in making the sulfonates used in this invention.

The production of sulfonates from detergent manufacture-by-products by reaction with, e.g., $SO_3$ is well known to those skilled in the art. See, for example, the article "Sulfonates" in Kirk-Othmer "Encyclopedia of Chemical Teclinology," Second Edition, Volume 19, page 291 et seq. published by John Wiley & Sons, New York (1969).

Also included are aliphatic sulfonic acids such as paraffin wax sulfonic acids, unsaturated paraffin wax sulfonic acids, hydroxy-substituted paraffin wax sulfonic acids, hexapropylene sulfonic acids, tetra-amylene sulfonic acids, polyisobutene sulfonic acids wherein the polyisobutene contains from 20 to 7000 or more carbon atoms, chloro-substituted paraffin wax sulfonic acids, nitroparaffin wax sulfonic acids, etc.; cycloaliphatic sulfonic acids such as petroleum naphthene sulfonic acids, cetyl cyclopentyl sulfonic acids, lauryl cyclohexyl sulfonic acids, bis-(di-isobutyl) cyclohexyl sulfonic acids, etc.

With respect to the sulfonic acids or calcium salts thereof described herein and in the appended claims, it is intended that the term "petroleum sulfonic acids" or "petroleum sulfonates" includes all sulfonic acids or the salts thereof derived from petroleums products. A particularly valuable group of petroleum sulfonic acids are the mahogany sulfonic acids (so called because of their reddish brown color) obtained as a by-product from the manufacture of petroleum white oils by a sulfuric acid process. A preferred calcium salt is a calcium salt of an aliphatic benzenesulfonic acid of the formula:

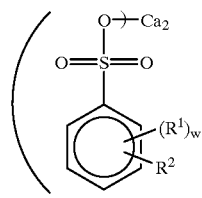

wherein $R^1$ contains 1 or 2 carbon atoms, $R^2$ contains at least 8 carbon atoms and w is zero or 1.

Other reactant chemicals or processing oils that are a necessary part of the process of this invention are at least one alcohol, a diluent solvent, a surfactant, calcium oxide, water and gaseous carbon dioxide.

Within the instant invention, the alcohol functions as a promoter. That is, the alcohol "promotes" the incorporation of the excess metal as a metal carbonate into the overbased material.

The broad class of compounds useful as the alcohol may be represented by the formula $$Q(OH)_n$$

wherein Q is a substituted or unsubstituted cyclic or acylic organic radical having at least one non-benzenoid carbon atom; n is an integer of from 1 to 6, preferably, 1 to 4 or 1 to 3, and most desirably 1; and OH is bonded to a non-benezoid carbon atom in Q; said compound $Q(OH)_n$ having an ionization constant not greater than $1 \times 10^{-11}$ in water at 25° C.

The above formula includes, as its most numerous class, the various monohydric and polyhydric alcohols, of which the monohydric alcohols are preferred. While excellent results are obtained with unsubstituted monohydric alcohols; i.e. alcohols containing only carbon, hydrogen, and hydroxyl oxygen, for some purposes it is often desirable to employ an alcohol which contains at least one substituent group such as; e.g. halogen, amino, sulfide, disulfide, ether, etc.

Best results are usually obtained with monohydric alcohols which do not contain a homocyclic benzenoid ring structure and which have a molecular weight less than 150.

Illustrative of the various $Q(OH)_n$ compounds which may be used in accordance with the invention are: unsubstituted aliphatic monohydric alcohols; e.g., methyl, ethyl, propyl, isopropyl, butyl, sec-butyl, isobutyl, tertiary-butyl, amyl, n-hexyl, 4-methyl-pentyl-2, heptyl, n-octyl, capryl, n-nonyl, isononyl, 2-ethyl-hexyl, decyl, lauryl, and tetradecyl alcohols; substituted aliphatic nonohydric alcohols; e.g., chlorohexyl, bromo-octyl, fluorodecyl, amino-ethyl, methoxyethoxyethyl, and methylmercapto-ethyl alcohols; unsubstituted cycloaliphatic monohydric alcohols; e.g., cyclohexyl, methyl-cyclohexyl, tetrahydrofurfuryl, and decahydronaphthyl alcohols; substituted cycloaliphatic monohydric alcohols, e.g., 2-chloro-cyclohexyl and chlorinated methyl-cyclohexyl alcohols; aromatic-substituted aliphatic monohydric alcohols; e.g. benzyl, p-chorobenzyl, p-aminobenzyl, phenethyl, p-chlorophenethyl, and furfuryl alcohols; cycloaliphatic-substituted aliphatic monohydric alcohols; e.g., cyclohexylmethyl, cyclohexyl-ethyl, and methylcyclohexyl-ethyl alcohols; and the various polyhydric alcohols which contain from 2 to 6 hydroxyl groups; e.g., ethylene glycol, propylene glycol, quercitol, inositol, sucrose, mannose, sorbitol, butylene-glycol, glycerol, cyclohexanediol-1,4, pentaerythritol, and the like.

It is also within the scope of the present invention to use mixtures of two or more $Q(OH)_n$ compounds. Particularly useful in some instances are combinations of a low boiling alcohol such as methanol with a high boiling alcohol, such as pentanol. Alcohols of choice are mixtures of methanol, isobutyl alcohol and the various isomers of amyl alcohol.

The identity of the diluent solvent is not a particularly critical aspect of this invention. The diluent solvent will normally consist of inert organic liquids, that is, liquids which are chemically substantially inactive in the overbasing composition. While many of these inert organic liquids are nonpolar, this is not essential. Polar materials can also be used as the diluent solvent. The diluent solvent can have components characterized by relatively low boiling solvents, e.g., in the range of 25° to 120° C. to facilitate subsequent removal of a portion or substantially all of the diluent solvent from the overbased product or the diluent solvent can have a higher boiling point to protect against removal from the overbased product upon standing or heating. Obviously there is no criticality in an upper boiling limit on these liquids.

Representative liquids include the alkanes and haloalkanes of 5 to 17 carbon atoms, polyhalo- and perhaloalkanes of up to about 6 carbon atoms. The cycloalkanes of 5 or more carbon atoms, the corresponding alkyl- and/or halo-substituted cycloalkanes, the amyl hydrocarbons, the alkyllauryl hydrocarbons, the haloaryl hydrocarbons, ethers such as dialkyl ethers, alkyl amyl ethers, cycloalkyl ethers, cycloalkylalkyl ethers, alkanols, alkylene glycols, polyalkylene glycols, alkyl ethers of alkylene glycols and polyalkylene glycols, dibasic alkanoic acid diesters, silicate esters, and mixtures of these. Specific examples include petroleum ether, Stoddard Solvent, pentane, hexane, octane, isooctane, undecane, tetradecane, cyclopentane, cyclohexane, isopropylcyclo-hexane, 1,4-dimethylcyclohexane, cyclooctane, benzene, toluene, xylene, ethyl benzene, t-butyl benzene, halobenzenes, especially mono- and poly-chlorobenzenes such as chlorobenzene per se and 3,4-dichlorotoluene, mineral oils, n-propylether, isopropylether, isobutylether, n-amylether, methyl-n-butylether, methyl-n-amylether, cyclohexylether, ethoxycyclobexane, methoxybenzene, isopropoxybenzene, p-methoxytoluene, 1,2-difluorotetrachloro-ethane, dichlorofluoromethane, 1,2-dibromotetafluoroethane, trichlorofluoromethane, 1-chloropentane, 1,3-dichlorohexane, fornamide, dimethylformamide, acetamide, dimethylacetamide, diethylacetamide, propionamide, diisooctyl azelate, etc.

Also useful as diluent solvents are the low molecular weight liquid polymers generally classified as oligomers, which include the dimers, tetramers, pentamers, etc. Illustrative of this large class of materials are such liquids as the propylene tetramers, isobutylene dimers, and the like.

From the standpoint of availability, cost and performance, the liquid petroleum fractions represent a preferred class of diluent solvents. The alkyl, cycloalkyl and amyl hydrocarbons represent another preferred class of diluent solvents. Included within these preferred classes are benzene and alkylated benzenes, cycloalkanes and alkylated cycloalkanes, cycloalkenes and alkylated cycloalkenes such as found in naphthene based petroleum fractions, and the alkanes which are found in the paraffin based petroleum fractions. Petroleum ether, naphthas, mineral oils, Stoddard Solvent, toluene, xylene, etc., and mixtures thereof are examples of economical sources of suitable inert organic liquids which can function as the diluent solvent of the present invention.

The most preferred diluent solvents are those containing at least some mineral oil as a component of the diluent solvent. In the preferred class of diluent solvent, it is desirable that mineral oil comprise at least 1% by weight of the total diluent solvent, and preferably at least about 5% by weight. Those diluent solvents comprising at least 10% by weight mineral oil are especially useful. Further, mineral oil can serve as the exclusive diluent solvent.

Suitable acidic materials are disclosed in U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acid material although inorganic acid materials such as HCl, $SO_2$, $CO_2$, $H_2S$, $N_2O_3$, etc. are ordinarily employed as the acidic material. The acidic material will react with the calcium oxide to form a calcium salt, e.g., $CaO+HCl\rightarrow\rightarrow CaCl_2$. Alternatively, rather than using an acidic material and having a calcium salt formed in situ, one can dissolve a calcium salt in a small amount of water or alcohol and then add that to the overbasing system. The most preferred calcium salt would be an aqueous solution of calcium chloride. The most preferred acidic materials are carbon dioxide and acetic acid.

A surfactant that is useful in the preparation of the overbasing product of the process of this invention is a calcium salt of a formaldehyde coupled aliphatic phenol. When the equivalents of calcium oxide to sulfonic acid are in excess of 10, it is necessary to employ a surfactant. Without a surfactant, the contents would gel, i.e., become too viscous which would indicate that carbonation is not taking place.

The following example illustrates the penetration of a surfactant:

Added to a reaction vessel are 2250 parts of mineral oil, 960 parts (5 moles) of heptylphenol and 50 parts of water and stirring is begun at 25° C. The mixture is heated to 40° C. and 7 parts of calcium hydroxide and 231 parts (7 moles) of 91% commercial paraformaldehyde is added over a period of 1 hour. The whole is heated to 80° C. and 200 additional parts of calcium hydroxide (making a total of 207 parts or 5 moles) is added over a period of I hour at 80–90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered. The filtrate, a 33.6% oil solution of the desired calcium phenate of heptyl-phenol-fomaldehyde condensation product is found to contain 7.56% sulfate ash.

In the instant invention, for every 100 parts of substrate that are present, there is present at least 0.1 parts of surfactant and preferably at least 2 parts of surfactant.

In the instant invention, the calcium oxide, water and carbon dioxide form a reaction cycle. Historically, calcium overbasing is conducted using either calcium hydroxide or equivalent amounts of calcium oxide and water such that calcium hydroxide is formed in situ. In either case large amounts of water are generated when the calcium hydroxide reacts with the carbon dioxide. This large amount of water stays in the reaction mixture during the overbasing and stripping and causes a deleterious process effect. Since so much water is present, there is an increase in the in-process viscosity. This increase in viscosity does not manifest itself in the viscosity of the final product. However, on scale-up, with an increase in viscosity during processing or overbasing, heat transfer becomes restricted, so much so that the carbonation time is extended because heat cannot be removed fast enough from the batch.

These deleterious effects are not present in the instant invention because of the calcium oxide, water and carbon dioxide reaction cycle. The key to the instant invention is the small amount of water that is employed for every 100 parts of substrate, water is present at not more than 25 parts and preferably not more than 20 parts.

In the process for producing an overbased oil soluble calcium sulfonate, the following steps need to be adhered to. Step (a) involves forming a mixture of a substrate, at least one alcohol, a diluent solvent, a carboxylic acid, an acid material, water and calcium oxide. If the substrate is a sulfonic acid, then in step (b) there is a reaction between the sulfonic acid and also the carboxylic acid with the calcium oxide to form a calcium sulfonate and calcium carboxylate, respectively; in other words, forming a neutal calcium salt of the acid moieties, the acid moieties being the sulfonic acid and carboxylic acid. A calcium sulfonate and calcium salt of a sulfonic acid are one and the same and are used interchangeably. For every two moles of sulfonic acid present, one mole of water is generated.

In step (c) the distillable solvents of the alcohols, added water and water of neuralization is substantially removed to form an intermediate residue.

In step (d) added to the intermediate residue is at least one alcohol, a surfactant, calcium oxide and water which forms an intimate mixture. This added water obeys the parameters of the above with respect to the substrate and water level. The added water is added such that for every 100 parts of substrate, the total water present (water of reaction and added water) is not more than 25 parts. Step (d) is further distinguished in that this intimate mixture has a direct base number of from 90–250. The direct base number relates to any unconsumed calcium oxide. In this overbasing system, the calcium oxide reacts with the sulfonic acid and carboxylic acid to form calcium sulfonate and calcium carboxylate respectively. The calcium sulfonate, and calcium carboxylate do not give a direct base number measurement, i.e., these salts do not titrate to phenolphthalein indicator. Calcium present as the overbased calcium is in the form of calcium carbonate. This calcium carbonate also does not give a direct base number measurement. The substantially remaining calcium is present either as calcium oxide or as calcium hydroxide. In determining the direct base number, a sample is withdrawn from the reactor and placed into a vessel. Contained in the sample are primarily calcium sulfonate, calcium carboxylate, calcium carbonate, alcohols, diluent oil, surfactant and unconsumed calcium oxide. Water is added to the vessel and the calcium oxide is converted to calcium hydroxide. The calcium hydroxide is then titrated against an inorganic acid using phenolphthalein as an indicator such that the direct base number is determined.

Step (e) involves the heating of the step (d) intimate mixture to form a heated intimate mixture. The temperature of the heated intimate mixture is almost to the reflux point of the contents of the reaction vessel. The reflux point is a function of the alcohols and diluent solvent that are present. When the diluent solvent is mineral oil, the reflux point is then a function of the alcohol employed as well as the amount of said alcohol employed.

Step (f) is directed to the beginning of the overbasing procedure. In (f), no water or very little water is present. All, or most of, the water that was added in (d) is consumed by reacting with calcium oxide to form the small amount of calcium hydroxide. Gaseous carbon dioxide is then added below the surface of the contents. The carbon dioxide immediately reacts with this small amount of calcium hydroxide to form calcium carbonate which is dispersed within the reaction system. The reaction of calcium hydroxide and carbon dioxide also generates water. The formed water reacts with calcium oxide to form calcium hydroxide and then the overbasing reaction cycle repeats itself. In (f) the direct base number is permitted to fall into the range of 90–150 using phenolphthalein as an indicator.

In step (g) additional calcium oxide is added which takes the direct base number into the range of 90–250. This is followed by the passing of additional gaseous carbon dioxide into the system until the direct base number falls into the range of 90–150. Step (g) may be performed one time or several times if the calcium oxide is added incrementally. When calcium oxide is added in increments, a substantial rise is observed in the direct base number. However, in step (g) calcium oxide can be added continuously. When calcium oxide is added in a continuous manner, the direct base number can be maintained at an essentially constant level.

Once the final portion of calcium oxide is added, either incrementally or continuously, carbon dioxide is added in step (h) until the direct base number is between 0 and 75. An exhaustive carbonation, direct base number of zero, is carried out for an overbased material that has a low (less than 5) metal to substrate ratio. The lower the metal ratio (metal to substrate), the lower the total base number. For an overbased product with a low metal ratio, the total base number may be about 80. This product would not need any residual direct base number and during processing, the direct base number would be close to zero. For overbased products with a high metal ratio of perhaps greater than 10, the total base number is about 400 and residual direct base number is necessary in order to keep the calcium carbonate soluble.

Within step (i), once the carbonation is complete, the next step is to remove the distillable solvents that are present. These distillable solvents are the alcohol promoters, water and the diluent solvent, providing the diluent solvent is distillable. This step forms a substantially solvent-free residue and in step (i) the substantially solvent-free residue is filtered to give a solids-free oil soluble overbased calcium sulfonate.

It is to be noted within the process of this invention of the proviso the calcium oxide is the only substantial source of overbasing calcium.

The terms "overbased," "superbased," and "hyperbased" are terms of art which are generic to well known classes of metal-containing materials which have generally been employed as detergents and/or dispersants in lubricating oil compositions. These overbased materials have also been refined to as "complexes," "metal complexes, "high metal-containing salts" and the like. Overbased materials are characterized by a metal content in excess of that which would be present according to the stoichiometry of the metal and the particular organic compound reacted with the metal, e.g., a sulfonic acid. Thus if a monosulfonic acid,

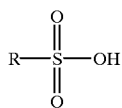

is neutralized with a basic metal compound, e.g., calcium oxide, the "normal" metal salt produced will contain one equivalent of calcium for each equivalent of acid, i.e.,

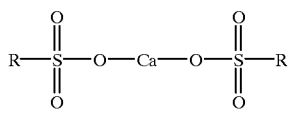

However, as is well known in the art, various processes are available which result in an inert organic liquid solution of a product containing more than the stoichiometric amount of metal. The solutions of these products are referred to herein as overbased materials. Following those procedures, the sulfonic acid or calcium salt thereof can be reacted with additional calcium oxide and the final product will contain an amount of metal in excess of that necessary to neutralize the sulfonic acid, for example 4.5 times as much metal as present in the normal salt for a metal excess of 3.5 equivalents. This actual stoichiometric excess of metal can vary considerably, for example, from about 0.1 equivalent to about 30 or more equivalents depending on the reactions, the process conditions, and the like. Generally the amount of calcium oxide is form 2 to 40 equivalents per equivalent of substrate (i), preferably the amount of calcium oxide is from 2 to 30 equivalents per equivalent of substrate (i) and most preferably the amount of calcium oxide is from 2 to 25 equivalents per equivalent of substrate (i).

In the present specification and claims, the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the calcium metal in the overbased calcium sulfonate to the chemical equivalents of calcium in the product which would be expected to result in the reaction between the organic material to be overbased (e.g., sulfonic acid) and the calcium oxide according to the known chemical reactivity and stoichiometry of the two reactants. Thus the normal calcium sulfonate discussed above, the metal ratio is one and in the overbased sulfonate, the metal ratio is 4.5.

In order to facilitate the overbasing of the sulfonic acid, it is sometimes desirable to have an organic acid present that is not the above-described sulfonic acids or acidic materials. The organic acid most preferred is a carboxylic acid. The carboxylic acids for use in this invention can include aliphatic, cycloaliphatic and aromatic mono- and polybasic carboxylic acids such as the napthenic acids, alkyl- or alkenyl- substituted cyclohexanoic acids, alkyl- or alkenyl-substituted aromatic carboxylic acids. The aliphatic acids generally contain at least 8 carbon atoms and preferably at least 12 carbon atoms. Usually they have no more than about 400 carbon atoms. Generally, if the aliphatic carbon chain is branched, the acids are more oil-soluble for any given carbon atom content. The cycloaliphatic and aliphatic carboxylic acids can be saturated or unsaturated. Specific examples include 2-ethylhexanoic acid, α-linoleic acid, propylene-tetramer-substituted maleic acid, behenic acid, isostearic acid, pelargonic acid, capric acid, palmitoleic acid, linoleic acid, lauric acid, oleic acid, ricinoleic acid, undecylic acid, dioctyl-cyclopentane carboxylic acid, myristic acid, dilauryl-decahydronaphthalene carboxylic acid, stearyloctahydroindene carboxylic acid, palmitic acid, commercially available mixtures of two or more carboxylic acids such as tall oil acids, resin acids, and the like.

A typical group of oil-soluble carboxylic acids useful as a component with the sulfonic acids are the oil-soluble aromatic carboxylic acids. These acids are represented by the general formula

IV

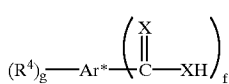

wherein $R^4$ is an aliphatic hydrocarbon-based group of at least 4 carbon atoms, and no more than about 400 aliphatic carbon atoms, g is an integer from one to four, Ar is a polyvalent aromatic hydrocarbon nucleus of up to about 14 carbon atoms, each X is independently a sulfur or oxygen atom, and f is an integer of from one to four with the proviso that $R^4$ and g are such that there is an average of at least 8 aliphatic carbon atoms provided by the $R^4$ groups for each acid molecule represented by Formula IV. Examples of aromatic nuclei represented by the variable Ar are the polyvalent aromatic radicals derived from benzene, naphthalene, anthracene, phenanthrene, indene, fluorene, biphenyl, and the like. Generally, the radical represented by Ar will be a polyvalent nucleus derived from benzene or naphthalene such as phenylenes and naphthylene, e.g., methylphenylenes, ethoxyphenylenes, nitrophenylenes, isopropylenes, hydroxyphenylcnes, mercaptophenylenes, N,N-diethylaminophenylenes, chlorophenylenes, N,N-dimethylaminophenylenes, dipropoxynaphthylenes, triethylnaphthylenes, and similar tri-, tetra-, pentavalent nuclei thereof, etc.

The $R^4$ groups are usually hydrocarbyl groups, preferable groups such as alkyl or alkenyl radicals. However, the $R^4$ groups can contain small number substituents such as phenyl, cycloalkyl (e.g., cyclohexyl, cyclo-pentyl, etc.) and non-hydrocarbon groups such as nitro, amino, halo (e.g., chloro, bromo, etc.), lower alkoxy, lower alkyl mercapto, oxo substituents (i.e., =O), thio groups (i.e., =S), interrupting groups such as —NH—, —O—, —S—, and the like, provided the essentially hydrocarbon character of the $R^4$ group is retained. The hydrocarbon character is retained for purposes of this invention so long as any non-carbon atoms present in the $R^4$ groups do not account for more than about 10% of the total weight of the $R^4$ groups.

Examples of the $R^4$ groups include butyl, isobutyl, pentyl, octyl, nonyl, dodecyl, docosyl, tetracontyl, 5-chlorohexyl, 4-ethoxyphentyl, 4-hexenyl, 3-cyclohexyloctyl, 4-(p-chlorophenyl)-octyl, 2,3,5-trimethylheptyl, 4-ethyl-5-methyloctyl, and substituents derived from polymerized olefins such as polychlorenes, polyethylenes, polypropylenes, polyisobutylenes, ethylenepropylene copolymers, chlorinated olefin polymers, oxidized ethylene-propylene copolymers, and the like. Likewise, the Ar group may contain non-hydrocarbon substituents, for example, such diverse substituents as lower alkoxy, lower alkyl mercapto, nitro, halo, alkyl, or alkenyl groups of less than 4 carbon atoms, hydroxy mercapto, and the like.

Another group of useful carboxylic acids are those of the formula

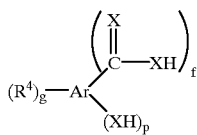

V wherein $R^4$, X, Ar, f and g are as defined in Formula IV and p is an integer of 1 to 4, usually 1 or 2. Within this group, an especially preferred class of oil-soluble carboxylic acids are those of the formula

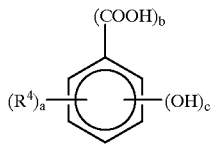

VI wherein $R^4$ is as defined in Formula III above, a is an integer of from 1 to 3, b is 1 or 2, c is zero, 1 or 2 and preferably 1 with the proviso that $R^4$ and a are such that the acid molecule contains at least an average of about 12 aliphatic carbon atoms in the aliphatic hydrocarbon substituents per acid molecule. And within this latter group of oil-soluble carboxylic acids, the aliphatic-hydrocarbon substituted salicylic acids, wherein each aliphatic hydrocarbon substituent contains an average of at least about 16 carbon atoms per substituent and 1 to 3 substituents per molecule are particularly useful. Salts prepared from such salicylic acids, wherein the aliphatic hydrocarbon substituents arc derived from polymerized olefins, particularly polymerized lower 1-mono-olefins such as polyethylene, polypropylene, polyisobutylene, ethylene/propylene copolymers and the like and having average carbon contents of about 30 to about 400 carbon atoms.

The carboxylic acids corresponding to Formulae V–VI above are well-known or can be prepared according to procedures known in the art. Carboxylic acids of the type illustrated by the above formulae and processes for preparing their overbased metal salts are well-known and disclosed, for example, in such U.S. Pat. Nos. as 2,197,832; 2,197,835; 2,252,662; 2,252,664; 2,714,092; 3,410,798 and 3,595,791, which are incorporated by reference herein for their disclosure of acids and methods of preparing overbased salts.

Another type of carboxylic acid that can be used in conjunction with the sulfonic acids are those derived from alkenyl succinic acids and succinic anhydrides of the general formulae:

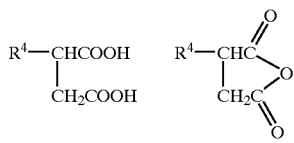

VII where $R^4$ is as defined in Formula III above.

The alkenyl succinic acids and anhydrides are well known to those skilled in the art. See, for example, the following U.S. patents which are hereby incorporated by reference for their disclosures relating to the preparation of these acids and anhydrides: U.S. Pat. No. 3,219,666; 3,272,746; 3,381, 102; 3,254,025; 3,278,550; 3,288,714; 3,271,310; 3,373, 111; 3,346,354; 3,272,743; 3,374,174; 3,307,928; and 3,394, 179.

Generally, the alkenyl succinic acids and anhydrides are prepared by reacting an olefin polymer or chlorinated analog thereof with an unsaturated carboxylic acid or derivative thereof such as acrylic acid, fumaric acid, maleic anhydride and the like. Typically, the alkenyl succinic acids and anhydrides are succinic acid acylating agents derived from maleic acid, its isomers, anhydride and chloro and bromo derivatives.

These acids and anhydrides have at least one hydrocarbyl-based substituent $R^4$ of about 5 to about 100 carbon atoms. Generally, $R^4$ has an average of at least about 8, and often at least about 18 carbon atoms. Typically, $R^4$ has a maximum average of about 50 and often about 36 carbon atoms.

In general, the hydrocarbon-based substituent $R^4$ of at least 5 carbon atoms present in the alkenyl succinic acids and anhydrides used in this invention are free from acetylenic unsaturation; ethylenic unsaturation, when present will generally be such that there is not more than one ethylenic linkage present for every ten carbon-to-carbon bonds in the substituent. The substituents may be completely saturated or contain ethylenic unsaturation.

As noted above, the hydrocarbon-based substituent $R^4$ present in the alkenyl succinic acids and anhydrides of this invention are derived from olefin polymers or chlorinated analogs thereof. The olefin monomers from which the olefin polymers are derived are polymerizable olefins and monomers characterized by having one or more ethylenic unsaturated groups. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group

>C=CH$_2$

However, certain internal olefins can also serve as monomers (these are sometimes referred to as medial olefins). When such olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about 2 to about 16 carbon atoms. A more typical class of olefin polymers is selected from that group consisting of homo- and interpolymers of terminal olefins of two to six carbon atoms, especially those of two to four carbon atoms.

Specific examples of terminal and medial olefin monomers which can be used to prepare the olefin polymers from which the hydrocarbon based substituents in the acylating agents used in this invention are ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene-1,2, butadiene-1,3, pentadiene-1,2, pentadiene-1,3 isoprene, hexadiene-1,5, 2-chloro-butadiene-1,3, 2-methylheptene-1, 3-cyclohexylbutene-1, 3,3-dimethylpentene-1, styrenedivinylbenzene, vinylacetate, allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s. As indicated above, polyisobutenyl substituents are preferred in connection with the present invention. These polyisobutenyl polymers may be obtained by polymerization of a C$_4$ refinery stream having a butene content of about 35 to about 75 percent by weight and an isobutene content of about 25 to about 65 percent by weight in the presence of a Lewis acid catalyst such as aluminum chloride or boron trifluoride. These poly(iso-butene)s contain predominantly (that is, greater than 80%) isobutene repeat units of the configuration

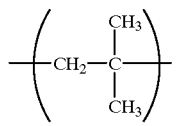

Typically, the hydrocarbyl-based substituent R$^4$ in the polycarboxylic acid acylating agent as used in the present invention is a hydrocarbyl, alkyl or alkenyl group of about 4, often about 30, preferably about 35, to about 400, sometimes about 200, preferably about 100 carbon atoms.

Such succinic acid acylating agents can be made by the reaction of maleic anhydride, maleic acid, or fumaric acid with the aforedescribed olefin polymer, as is shown in the patents referred to above. Generally, the reaction involves merely heating the two reactants at a temperature of about 150° C. to about 200°. Mixtures of these polymeric olefins, as well as mixtures of these unsaturated mono- and polycarboxylic acids can also be used.

A comparative example is shown below where a calcium overbased sulfonic acid is prepared by the industry-wide standard procedure utilizing calcium hydroxide.

COMPARATIVE EXAMPLE

Added to a 12 liter 4-neck flask are 1911 parts blend oil and 235 parts (0.42 equivalents) of a polyisobutene (molecular weight of 1000)—substituted succinic anhydride (having a saponification number of 100). Stirring is begun and 142 parts iso-butyl alcohol and 95 parts iso-amyl alcohol is added followed by a solution of 9 parts calcium chloride dissolved in 60 parts water. The contents are permitted to stir for S minutes and added is 163 parts (4.41 equivalents) of calcium hydroxide and the contents are heated to 55° C. and added is 1632 parts (2.86 equivalents) of an alkylated benzene sulfonic acid (molecular weight of 571). The temperature is increased to 150° C. and held for 3 hours while sweeping with nitrogen at 0.5 cubic feet per hour.

The contents are cooled to 50° C. as quickly as possible and added with stirring is 485 parts methyl alcohol, 355 parts isobutyl alcohol, 236 parts isoamyl alcohol, 206 parts of the above-prepared heptyl-phenol-formaldehyde surfactant and the first increment of 364 parts (9.83 equivalents) of calcium hydroxide. The contents are stirred for 0.5 hours and then carbon dioxide is bubbled below the surface at 0.77 standard cubic feet per hour for 3.75 hours to a direct base number of 110. Then increments 2 through 6 of calcium hydroxide, wherein each increment is 364 parts (9.84 equivalents) is added and each increment is blown with carbon dioxide at 0.77–0.82 standard cubic feet per hour for 3.5–5 hours to a direct base number of 50–60, except in the case of the last increment that is blown to 52 (a blow-down of 3.5 hours). The contents are stripped of volatile solvents to a temperature of 150° C. with nitrogen sweeping. Added is 500 parts of a diluent oil followed by a diatomaceous filtering aid and the contents are filtered while hot. Analyses: total base number 420; % calcium 15.3%.

The process for preparing overbased calcium sulfonate detergents in the manner of this invention is illustrated by the following example.

EXAMPLE 1

Added to a 12 liter 4-neck flask are 1680 parts of a diluent oil and 207 parts (0.37 equivalents) of a polyisobutene (molecular weight of 1000)—substituted succinic anhydride (having a saponification number of 100). Stirring is begun and 125 parts iso-butyl alcohol and 83 parts iso-amyl alcohol is added followed by a solution of 8 parts calcium chloride dissolved in 87 parts water. The contents are permitted to stir for 5 minutes and added is 109 parts (3.89 equivalents) of calcium oxide and the contents are heated to 55° C. and added is 1435 parts (2.51 equivalents) of an alkylated benzene sulfonic acid (molecular weight of 571). The temperature is increased to 150° C. and held for 3 hours while sweeping with nitrogen at 0.5 cubic feet per hour. The distillate obtained is a combination of 262 parts aqueous and organic.

Added at room temperature and with stirring is 438 parts methyl alcohol, 320 parts isobutyl alcohol, 213 parts isoamyl alcohol, 208 parts water, 186 parts of the above-prepared heptyl-phenol-formaldehyde surfactant and the first increment of 435 parts (15.5 equivalents) of calcium oxide. The contents are stirred for 0.5 hours and then carbon dioxide is bubbled below the surface at 0.77 standard cubic feet per hour for 3.75 hours to a direct base number of 110. Then increments 2 through 6 of calcium oxide, wherein each increment is 217 parts (7.75 equivalents) is added and each increment is blown with carbon dioxide at 0.77–0.82 standard cubic feet per hour for 3.5–5 hours to a direct base number of 90–100, except in the case of the last increment that is blown to 52 (a blow-down of 7.5 hours). The contents are stripped of volatile solvents to a temperature of 150° C. with nitrogen sweeping. A diatomaceous filtering aid is added and the contents are filtered while hot. Analyses: total base number 397, % calcium 14.6.

As stated earlier, the in-processing viscosity is much lower for the process by the instant invention versus the in-process viscosity of an industry-wide standard process. The following data as Table I demonstrates this effect.

TABLE I

In-Process Brookfield Viscosity Measurements

| Measurement at End of Increment | Example 1 Brookfield Viscosity | Comparative Example 1 Brookfield Viscosity |
|---|---|---|
| 1 | 150 | 100 |
| 2 | — | 760 |
| 3 | — | 1060 |
| 4 | — | 1100 |
| 5 | 500 | 2150 |
| 6 | 700 | 6300 |

It is readily apparent how much less viscous during processing the product of the instant invention is when compared to the viscosity of a product prepared by the industry-wide process.

While the invention has been explained in relation to its preferred embodiments, it is to be understood that various modifications thereof will become apparent to those skilled in the art upon reading the disclosure. Therefore, it is to be understood that the invention disclosed herein is intended to cover such modifications as fall within the scope of the appended claims.

What is claimed is:

1. A process for producing an overbased oil soluble calcium sulfonate, comprising the steps of:
    (a) mixing a substrate comprising a sulfonic acid wherein the sulfonic acid is of the formulae

       (I)

       (II)

       (III)

wherein $R^1$ is an alkyl group containing 1 or 2 carbon atoms, $R^2$ is an alkyl group containing at least 12 carbon atoms, $R^3$ is an aliphatic group containing at least 15 carbon atoms, T is a benzene or naphthalene nucleus and within (I), x, y and z are each independently an integer of 1 up to 3 times the number of aromatic nuclei present in T with the proviso that the sum of x, y and z does not exceed the unsatisfied valences of T or within (II), y is an integer of from 1 to 3 and z is an integer of from 1 to 4 with the proviso that the sum of y and z does not exceed the unsatisfied valences of T or a calcium salt of a sulfonic acid, with at least one alcohol wherein the alcohol is a mixture of methanol, isobutyl alcohol and amyl alcohol, a diluent oil, a carboxylic acid, wherein the carboxylic acid is a polybasic carboxylic acid of the formula

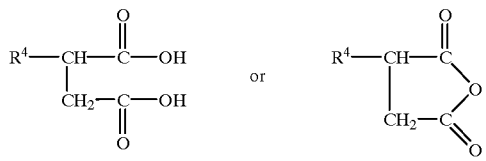

wherein $R^4$ is an aliphatic hydrocarbon based group of from 4 to 400 aliphatic carbon atoms, an acidic material of calcium chloride, water and calcium oxide to form a mixture;
    (b) heating the mixture to its reflux point to form a neutral calcium salt of the acid moieties;
    (c) removing a substantial portion of distillable solvents to form an intermediate residue;
    (d) adding to the intermediate residue at least one alcohol, a surfactant wherein the surfactant is a calcium salt of a formaldehyde coupled aliphatic phenol, calcium oxide and water such that for every 100 parts of substrate, there are not more than 25 parts water to form an intimate mixture having a direct base number of 90–250;
    (e) heating said intimate mixture (d) to below its reflux point to form a heated intimate mixture;
    (f) passing gaseous carbon dioxide into the heated intimate mixture (e) to form an overbased calcium sulfonate and a mixture of calcium hydroxide, calcium carbonate and regenerated water until the direct base number is from 90–150;
    (g) adding additional calcium oxide until the direct base number is from 90–250 followed by the passing of additional gaseous carbon dioxide until the direct base number is from 90–150;
    (h) continuing the passing of gaseous carbon dioxide to a direct base number of 0–75 after the last portion of calcium oxide is added;
    (i) removing any distillable solvents to form a final residue; and
    (j) filtering the final residue to obtain a substantially solvent-free and solids-free oil soluble overbased calcium sulfonate;
with the proviso that calcium oxide is the only substantial source of overbasing calcium.

2. The process of claim 1 wherein $R^2$ contains from 16 to 50 carbon atoms.

3. The process of claim 1 wherein T is a benzene nucleus.

4. The process of claim 1 wherein within (I) or (II), z is 1.

5. The process of claim 1 where x is 1.

6. The process of claim 1 wherein within (I), both x and y are 1.

7. The process of claim 1 wherein the substrate is a calcium salt of an alkyl sulfonic acid.

8. The process of claim 1 wherein $R^4$ is from 5 to 100 carbon atoms.

9. The process of claim 1 wherein the alkyl group of the alkyl phenol contains from 6 to 12 carbon atoms.

10. The process of claim 1 wherein the additional calcium oxide (g) is added continuously or incrementally.

11. The process of claim 10 wherein the additional calcium oxide (g) is added continuously.

12. The process of claim 10 wherein the additional calcium oxide is added incrementally.

13. The process of claim 1 wherein for every 100 parts of substrate, there are present not more than 20 parts water.

14. The process of claim 1 wherein the amount of calcium oxide is from 2 to 40 equivalents per equivalent of the substrate.

15. The process of claim 1 wherein the amount of calcium oxide is from 2 to 30 equivalents per equivalent of the substrate.

16. The process of claim 1 wherein the amount of calcium oxide is from 2 to 25 equivalents per equivalent of the substrate.

17. The process of claim 1 wherein for every 100 parts of substrate, there are present at least 0.1 parts of surfactant.

18. The process of claim 1 wherein for every 100 parts of substrate, there are present at least 2 parts of surfactant.

* * * * *

UNITED STATES PATENT AND TRADEMARK OFFICE
CERTIFICATE OF CORRECTION

PATENT NO. : 6,015,778
DATED : January 18, 2000
INVENTOR(S) : Allen J. Rolfes et al.

It is certified that error appears in the above-identified patent and that said Letters Patent is hereby corrected as shown below:

Column 3, lines 28-29, delete "a sulfuric acid or a calcium salt of a sulfuric acid", and insert in lieu thereof --a sulfonic acid or a calcium salt of a sulfonic acid--.

Signed and Sealed this

Thirtieth Day of January, 2001

*Attest:*

Q. TODD DICKINSON

*Attesting Officer*     *Director of Patents and Trademarks*